Figure 1:
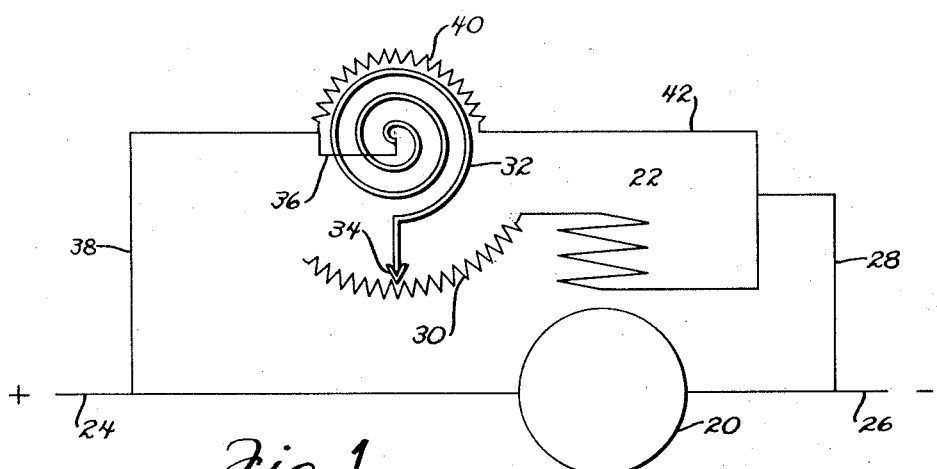

Oct. 14, 1952  D. F. ALEXANDER  2,614,238
DIRECT CURRENT MOTOR CONTROL
Filed Dec. 1, 1945

INVENTOR.
Donald F Alexander
BY
Spencer Hardman and Fehr
Attorneys

Patented Oct. 14, 1952

2,614,238

UNITED STATES PATENT OFFICE 2,614,238

DIRECT CURRENT MOTOR CONTROL

Donald F. Alexander, Oakwood, Ohio, assignor to General Motors Corporation, Dayton, Ohio, a corporation of Delaware Application December 1, 1945, Serial No. 632,189

2 Claims. (Cl. 318—331)

This invention relates to electrical apparatus and more particularly to constant speed direct current motors.

Frequently direct current power supplies have large voltage variations in their output. This causes the motors supplied from such power source to vary in speed even though they be shunt motors.

It is an object of my invention to provide a simple regulating means for preventing variations in speed of direct current motors having a shunt field winding under variations of voltage supply.

It is another object of my invention to provide a simple inexpensive means for varying the current in the shunt field winding to compensate for the voltage variations of the supply source.

It is another object of my invention to provide an electrothermal means for varying the current in the shunt field winding to compensate for voltage variations in the supply source.

Briefly, to attain these objects I connect a variable resistance in series with the shunt field winding of the direct current shunt motor. To keep the motor operating at a constant speed regardless of voltage variations I provide an electrothermal device for increasing the variable resistance as the supply voltage falls in order to keep the motor operating at a constant speed. In a second form, a rotary electromagnetic device is employed to increase the variable resistance as the voltage falls.

Further objects and advantages of the present invention will be apparent from the following description, reference being had to the accompanying drawings, wherein a preferred form of the present invention is clearly shown.

Figure 2:
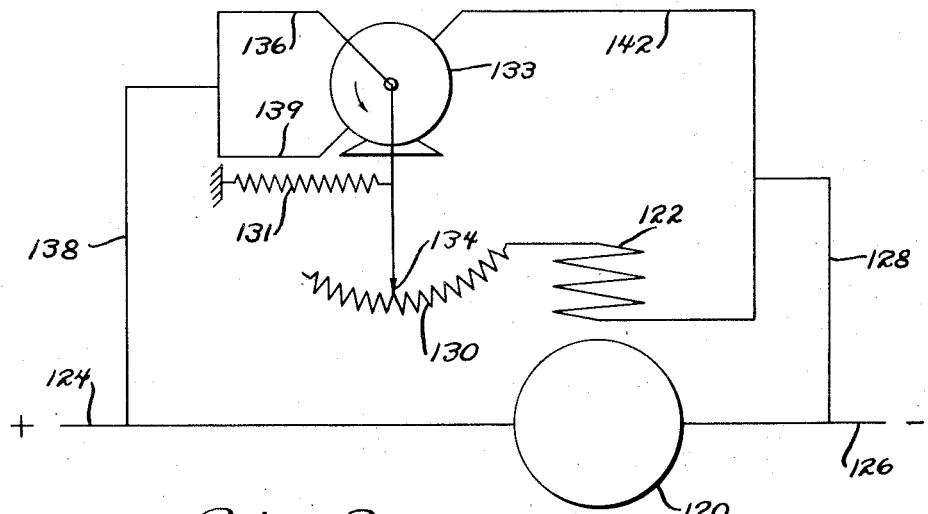

In the drawings:

Fig. 1 is a wiring diagram of a direct current shunt motor provided with an electrothermal device for operating the motor at a constant speed; and Fig. 2 is a wiring diagram similar to Fig. 1 showing a direct current shunt motor provided with an electromagnet regulating means for operating the motor at a constant speed.

Referring now more particularly to Fig. 1, there is shown a direct current shunt motor including an armature 20 and a shunt field winding 22. The armature 20 is connected directly to the supply conductors 24 and 26 in the conventional manner. The field winding 22 is connected by the conductor 28 to the supply conductor 26.

When supplied with direct current at a constant voltage a shunt motor will maintain a substantially constant speed, the speed falling ordinarily less than 5% between no load and full load. However, where the power supply is not constant, as is the case in many direct current power sources, the speed of the motor will vary with the changing voltage.

According to my invention I connect a variable resistance 30 in series with the field winding 22. The variable resistance is controlled by a spiral bimetal 32 having its outer end provided with a sliding contact 34 to make contact with the variable resistance 30 at suitable points. The anchorage of the bimetal 32 is connected by the conductors 36 and 38 to the supply conductor 24 to complete the field winding circuit. The spiral bimetal 32 is heated by a shunt heater 40 connected by the conductor 42 to the conductor 28 and connected at its other end directly to the conductor 38 so that it is connected directly across the supply conductors and therefore is heated in accordance with the voltage of the supply source.

The bimetal 32 is so arranged that the layer of metal having the lower coefficient of expansion is on the outside. This will cause the bimetal to move in a counterclockwise direction when heated so that the contact 34 is moved to reduce the resistance of the variable resistance 30 so as to increase the strength of the shunt field 22 as the voltage increases. This has the tendency of reducing the speed of the motor and compensates the tendency of the motor to increase its speed as the supply voltage rises. Conversely, when the supply voltage falls the heater 40 will give off less heat allowing the bimetal 32 to cool and move the contact 34 in a clockwise direction to increase the variable resistance 30 to weaken the field strength 32. This tends to increase the speed of the motor to compensate for the reducing tendency inherent in the fall in the voltage supply. By this arrangement the motor is kept operating at substantially constant speed.

In Fig. 2 the variable resistance 130 is operated by a rotary electromagnet device 133 provided with a movable contact arm 134 for making progressive contact with the variable resistance 130. This rotary electromagnet device 133 is connected by the conductor 139 and the conductor 138 with the supply conductor 124 and by the conductor 142 and the conductor 128 with the supply conductor 126. The movable arm carrying the contact 134 is connected by the conductor 136 to the conductor 138. The variable resistance 130 is connected in series with the shunt field 122 which in turn is connected to the conductor 128. The armature 120 is connected directly to the supply conductors 124 and 126.

According to this arrangement as the voltage of the supply source increases the torque of the electromagnetic device 133 will increase to move the contact 134 in a counterclockwise direction against the tension of the return spring 131. This will reduce the variable resistance to increase the field strength of the shunt field 122 so as to compensate for the tendency of the motor 120 to increase in speed under the application of the increased voltage. If the voltage is reduced the torque of the rotary electromagnet device 133 will reduce, allowing the return spring 131 to move the contact 134 in a clockwise direction to increase the variable resistance 130 to weaken the strength of the shunt field 122 so as to compensate for the tendency of the motor 120 to decrease in speed under the application of a lower supply voltage.

Thus by either of these very simple arrangements it is possible to obtain constant speed direct current motor operation without the use of expensive voltage regulating devices.

While the form of embodiment of the invention as herein disclosed, constitutes a preferred form, it is to be understood that other forms might be adopted, as may come within the scope of the claims which follow.

What is claimed is as follows:

1. A direct current motor and control system including a direct current motor having a shunt field and a variable resistance connected in series with the shunt field, a bimetal operating device for changing the resistance of said variable resistance, and an electrical shunt heating means electrically connected to both supply conductors of the motor for electrically heating said bimetal operating device in accordance with the voltage of the current supplied to the motor.

2. A direct current motor and control system including a direct current motor having a shunt field, a variable resistance connected in series with said shunt field, said variable resistance including a sliding tap for changing its electrical resistance, a temperature responsive means capable of changing its shape with temperature changes, means for operably connecting said temperature responsive means and said sliding tap to move the tap in accordance with the change in shape of the temperature responsive means, and a circuit in parallel with said motor having electrical heating means for heating said temperature responsive means in accordance with the voltage applied to the motor.

DONALD F. ALEXANDER.

REFERENCES CITED

The following references are of record in the file of this patent:

UNITED STATES PATENTS

| Number | Name | Date |
|---|---|---|
| 335,547 | Thomson | Feb. 2, 1886 |
| 374,910 | Stanley | Dec. 13, 1887 |
| 844,701 | Wantz | Feb. 19, 1907 |
| 1,860,556 | Sole | May 31, 1932 |

FOREIGN PATENTS

| Number | Country | Date |
|---|---|---|
| 349,978 | Germany | Dec. 25, 1919 |
| 566,811 | France | May 29, 1923 |